United States Patent [19]
Yao-Ko

[11] Patent Number: 5,146,382
[45] Date of Patent: Sep. 8, 1992

[54] FLOPPY DISK CLEANING MACHINE

[76] Inventor: Chen Yao-Ko, 1st Fl., No. 132, I An Rd., Chung Ho City, Taipei Hsien, Taiwan

[21] Appl. No.: 637,264

[22] Filed: Jan. 3, 1991

[51] Int. Cl.⁵ .................................... G11B 23/50
[52] U.S. Cl. .................... 360/137; 15/97.1; 360/128
[58] Field of Search ............ 360/137, 128; 15/97.1, 15/210 R; 369/72

[56] References Cited

U.S. PATENT DOCUMENTS

| | | | |
|---|---|---|---|
| 4,490,767 | 12/1984 | Neuman et al. | 360/137 |
| 4,825,497 | 5/1989 | Nagao et al. | 360/137 |
| 4,854,001 | 8/1989 | Mannheimer et al. | 369/72 |

FOREIGN PATENT DOCUMENTS 0046278  2/1989  Japan ........................ 369/72

Primary Examiner—David J. Severin
Attorney, Agent, or Firm—Patterson & Keough

[57] ABSTRACT

A floppy disk cleaning machine which has a locker to cause a cam above a link to compress a positioning plate for holding of a floppy disk, a sector wheel at an end of the link to drive a sector wheel at a driving rod which consequently disengage the cam from two rolling shafts which then cause two cleaning rods to hold the floppy disk at its read/write slots by action of a spring, and a motor with rubber shaft to drive a turn plate to rotate the floppy disk for cleaning purpose. The rolling shafts can be extended by the cam after the cleaning process for removal of the floppy disk from the cleaning machine.

4 Claims, 5 Drawing Sheets

FLOPPY DISK CLEANING MACHINE

BACKGROUND OF THE INVENTION

As a very convenient and low-priced storage medium, floppy disk may become not readable or damaged, or even damage disk driver because of contamination. Though there are ways to recover floppy disk, the cost is very expensive, and recovery is a time-consuming process. Moreover, contaminated floppy disk may contaminate disk driver's read/write head. Generally, disk driver is cleaned for proper reading and writing function, but such cleaning would damage the head as well, and can not recover contaminated diskette. It has not unable to clean floppy disk satisfactorily because of lack of suitable tools, and cleaning solution for disk driver may dissolve the protection coating on floppy disk even it has high hardness and it is acid and alkaline resistant. The traditional cleaning may deform floppy disk too. In view of such defects, the inventor has created a floppy disk cleaning machine. As this invention is mainly for the structure of such floppy disk cleaning machine, preparation of cleaning agent is not to be described here.

SUMMARY OF THE INVENTION

The present invention is related to a floppy disk cleaning machine, particular a mechanical structure for cleaning of floppy disk. It has a slot for insertion of a floppy disk. By locking of a locker a cam connecting to a link is caused to compress a positioning plate to hold the diskette, a link with sector wheel at its end to drive a driving rod with sector wheel to cause a cam to disengage from two rolling shafts, and by action of a spring two cleaning rods keep contact with the diskette's read/write slots, the diskette is rotated on a turn plate by driving of a rubber shaft connected to a motor for cleaning. At end of the cleaning process, the rolling shafts are extended by the cam so that the diskette can be removed from the machine.

DESCRIPTION OF THE PREFERRED EMBODIMENT

Figure 1:
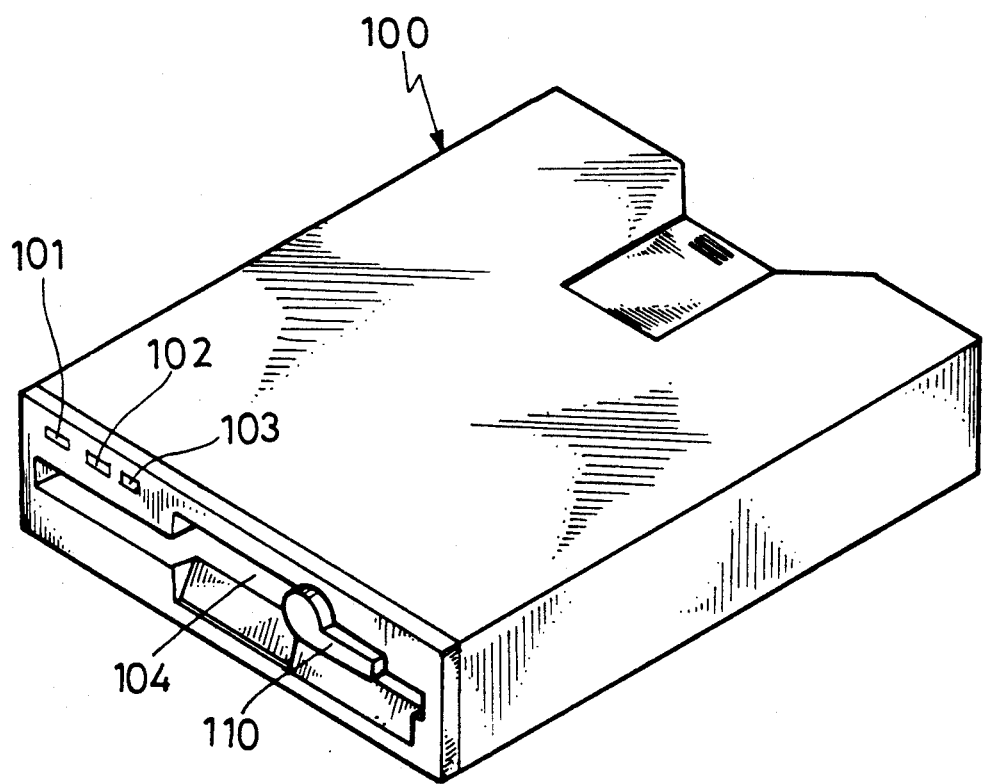
FIG. 1 is a prospective view of the preferred embodiment according to the present invention.
Figure 2:
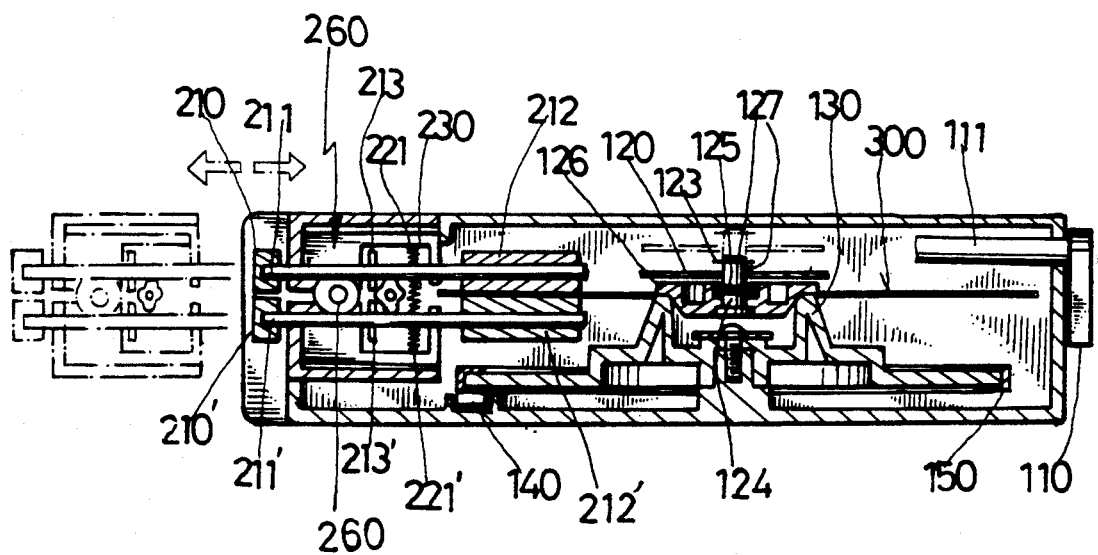
FIG. 2 is a cross-sectional view taken along line 2—2 of FIG. 3 looking in the direction of the arrow.
Figures 3, 4:
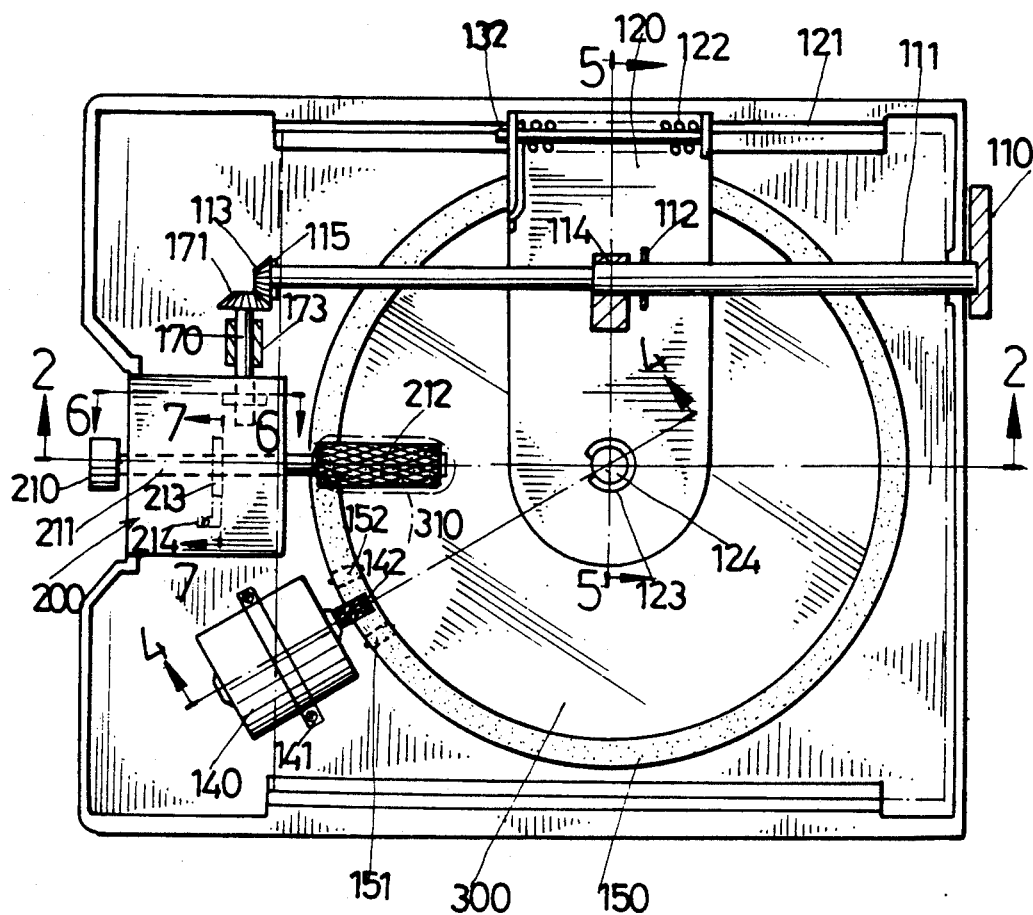
FIG. 3 is a top cross sectional view of the embodiment according to the present invention.
FIG. 4 illustrates transmission of the motor in the embodiment according to the present invention.
Figure 5:
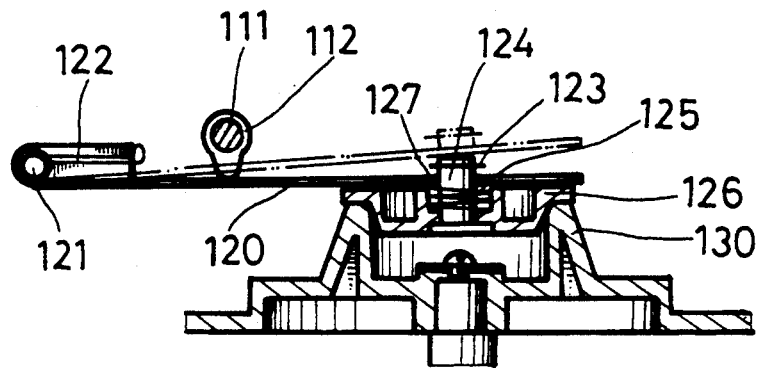
FIG. 5 illustrates a positioning plate according to the present invention.
Figure 6:
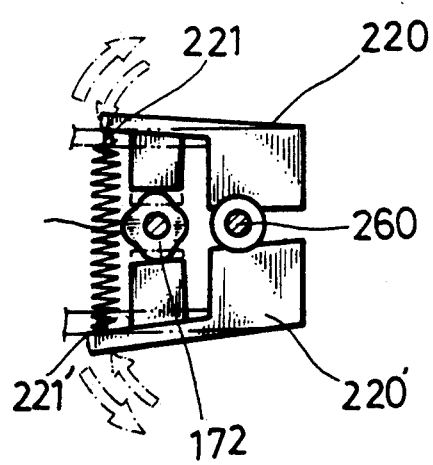
FIG. 6 illustrate the embodiment of a cleaner head assembly according to the present invention.
Figure 7:
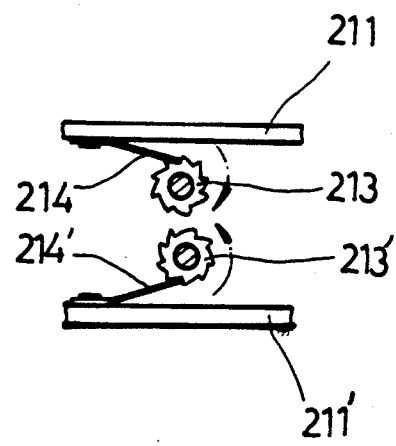
FIG. 7 illustrates the ratchet according to the present invention.

As shown in FIG. 1, the present invention has a structure similar to disk driver. It comprises a clearer body (100) with a completion indicator (101), a cleaning indicator (102) and a power source indicator (103) to indicate its working condition, a diskette entry slot (104), and a locker (110). As shown in FIGS. 2 and 3, the locker (110) is incorporated with a link (111) having a cam (112) at appropriate position. A sector wheel (113) is incorporated to an end of the link (111), and two positioners (114 and 115) are designed at an appropriate position on the link (111) to position and limit movement of the link (111). Whenever the cam (112) rotates, the cam (112) compress a positioning plate (120). As shown in FIGS. 2, 3, 5 and 8, the positioning plate (120) is fixed with a frame (121) and is reset by a torsion spring (121) when the cam (112) is not longer subject to external force There is a shaft (124) in the middle of the positioning plate (120). The shaft (124) is fixed to a block (126), and is surrounded by a tension spring (125). The shaft (124) is passing through a shaft hole (127) in the middle of the positioning plate (120), and is held by a U-shaped fastener (123) in a manner that a turntable (130) and the block (126) can hold a floppy disk to rotate between them, and the floppy disk is protected by the tension spring to prevent from over-stress.

Referring to FIGS. 3 and 4, the driving motor (140) in the preferred embodiment is held with a motor seat (141). When the driving motor (140) is running, it drives a rubber shaft (142) on its driving shaft, and consequently the rubber shaft (142) drives a driving disk (150) and then the turntable (130) to rotate. The driving disk (150) is surrounded by a layer of rubber to increase friction between it and the rubber shaft (142), and to reduce mechanical shock as well as noise. Beneath the driving disk (150) there is a plurality of support roller (151, 152) to prevent the rubber covered driving disk (150) from sliding during rotation driven by the rubber shaft (142).

Referring to FIGS. 2, 3, 6, 7 and 8, the cleaner head assembly (200) according to the present invention comprises two knobs (210 and 210,) connecting to two rolling shafts (211 and 211') respectively to control the position and to change cleaning side of two cleaning rods (212 and 212') on the roller shafts (211 and 211') to prevent from cleaning with contaminated cleaning side. The rolling shafts (211 and 211') are placed with two shaft blocks (220 and 220') respectively A movable pivot (260) is used for these rolling shafts (211 and 211'). When the cam (172) is controlled for operation, the cleaning rods (212 and 212') can release or hold the disk (300), and clean coating (310) on both sides of the disk (300).

The driving rod (170) according to the present invention is located in a driving rod holder (173) for operation. The driving rod (170) drives a driving sector wheel (171) through the sector wheel (113). A cam (172) is fixed at another end of the driving rod (170) so that whenever the driving rod (170) is driven by the link (111), the cam (172) is controlled and driven by the driving rod (170) to extend the shaft blocks (220 and 220') symmetrically, which consequently extend the cleaning rods (212 and 212') for removal and insertion of the diskette. Whenever the cam (172) is controlled to release the shaft blocks (220 and 220'), a tension spring (230) causes the cleaning rods (212 and 212') to hold the diskette. An end of the tension spring (230) is fixed to the shaft block (220) and its another end is fixed to another shaft block (220').

The rolling shafts (211 and 211') are rotatable to change the cleaning sides of the cleaning rods (212 and 212'). Each of the rolling shafts (211 and 211') has a ratchet (213 or 213') at appropriate position, and each of the shaft blocks (220 and 220') has a ratchet stopper (214 or 214') to prevent the cleaning rods (212 and 212') from rotation, and to prevent the rolling shafts (211 and 211') from rotation due to rotation of the diskette.

Figure 8:
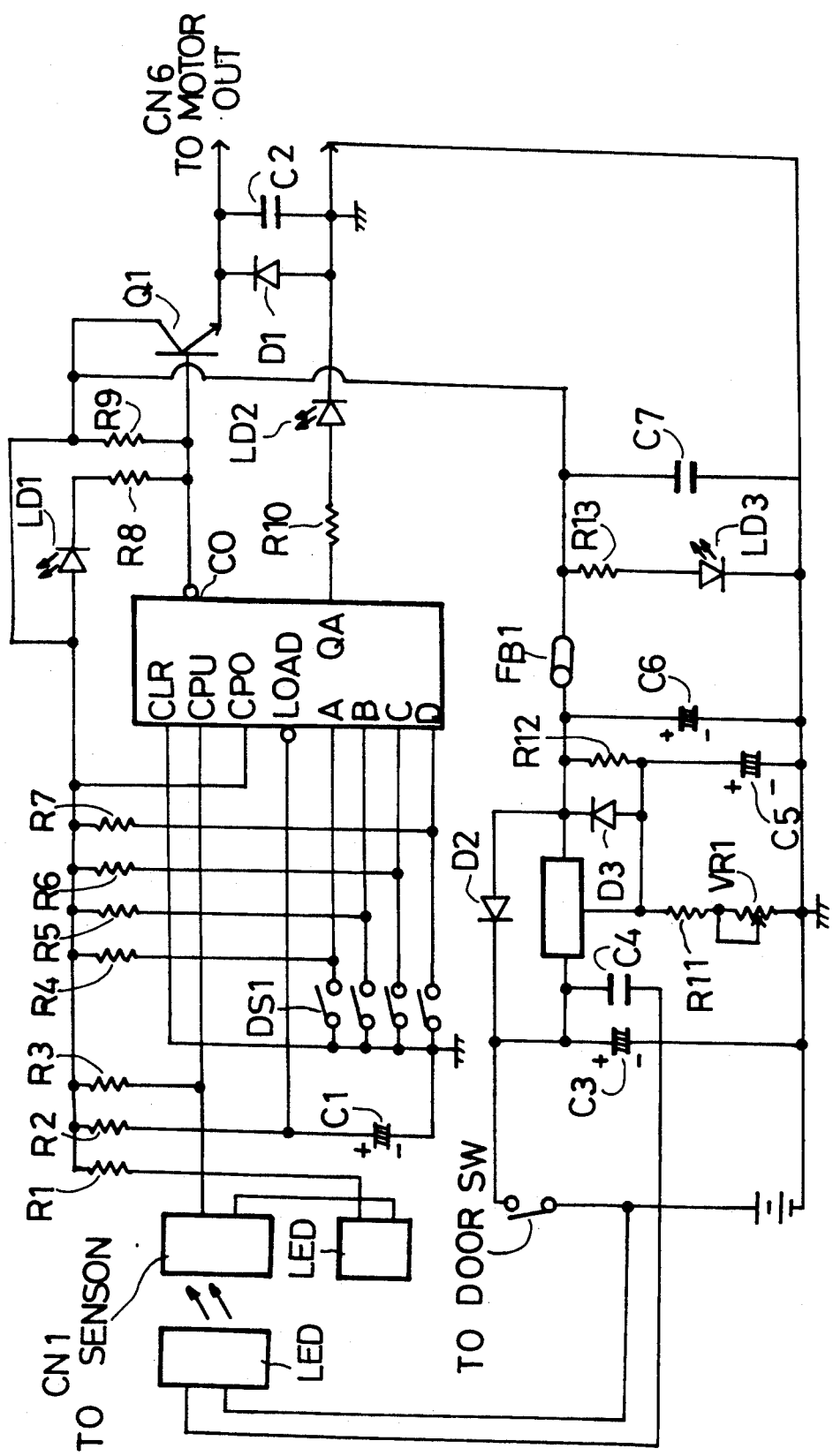
FIG. 8 is a control circuit diagram according to the present invention.

Referring to FIG. 8, the cleaning cycle control circuit is comprised of U1 and other related parts, the voltage regulation circuit is comprised of U2 and other related parts. VRI is for adjustment of the speed of the driving motor (140), CN3 is triggered by locking of the locker to turn on the cleaning machine, LD3 is a power source indicator, R2 and C1 is for setting for number of cleaning cycle, controlled by a binary switch DS1 which causes C0' of U1 to connect to Q1 and then start the driving motor (140) via CN6. When the CPU in UI detects signal for completion of a cycle from CN1, it make a count, and LD2, cleaning indicator, makes a flickering till the preset number of cleaning cycle is completed, then CO' of UI is disconnected from Q1, LD1 is lit to indicated completion of the cleaning process, the driving motor (140) is stopped immediately.

I claim:

1. A floppy disk cleaning machine comprising
   a rectangular body with a diskette insertion slot and a locker extending into the body to connect to a cam an appropriate with a link at an appropriate position above a positioning plate, which is fixed by a frame and supported by torsion spring, with a seat surrounded by tension spring in the middle, and a hole for passing through of a shaft fixed thereto by means of a U-shaped fastener, and the shaft driven by a motor via a rubber shaft to drive a turn plate to support a floppy disk;
   a cleaner head assembly located in the body, composed of mainly two knobs, two rolling shafts controlled by the knobs, two cleaning rods with rotatable cleaning sides on the rolling shafts in a manner that the rolling shafts are incorporated with shaft blocks and a second tension spring to cause two driving rods to control opening and closing of the rolling shafts so that the cleaning rods at their ends can release or hold a floppy disk; and
   a control circuit to count cycle of cleaning by detection with magnetic means or other sensor, light a completion indicator, cut off power source, and stop the motor at end of a present number of cleaning cycles; and
   assembled in a way so that the locking action of the locker can cause the torsion spring to cause the positioning plate to hold the floppy disk in place, and rotate the cam incorporating to the link, and cause the second tension spring to cause the cleaning rod to hold the floppy disk at its read/write slots, and start the motor to clean the floppy disk; the control circuit can stop the motor at end of cleaning process, and unlocking of the locker can cause the cleaning rod to move away from the read and write slots, the positioning plate to release the floppy disk, and permit removal of the floppy disk out of the cleaning machine.

2. A floppy disk cleaning machine as claimed in claim 1 wherein the motor has the shaft incorporated with the rubber shaft to drive the turn plate surrounded by a layer of rubber and the turn plate is supported by rollers to increase friction between the rubber shaft and the turn plate, to reduce mechanical shock and noise, to keep the turn plate rotating stably, and to prevent the turn plate from sliding.

3. A floppy disk cleaning machine as claimed in claim 1 wherein the cleaner head assembly has a tension spring and a cam to control opening and closing of the shaft blocks, and consequently control the cleaning rods to release and hold the floppy disk.

4. A floppy disk cleaning machine as claimed in claim 1 wherein the cleaning side of each cleaning rod can be controlled by turning of its respective knob, the cleaning rods are prevented from rotation following the rotation of the floppy disk by means of ratchets and ratchets stopper.

* * * * *

UNITED STATES PATENT AND TRADEMARK OFFICE
CERTIFICATE OF CORRECTION

PATENT NO. : 5,146,382

DATED : September 8, 1992

INVENTOR(S) : Chen Yao-Ko

It is certified that error appears in the above-identified patent and that said Letters Patent is hereby corrected as shown below:

Col. 2, line 34, "210," should be -- 210' --.

Col. 2, line 41, "211°" should be -- 211' --.

Col. 2, line 43, "212°" should be -- 212' --.

Signed and Sealed this

Twelfth Day of October, 1993

Attest:

BRUCE LEHMAN

*Attesting Officer*    *Commissioner of Patents and Trademarks*